No. 854,647. PATENTED MAY 21, 1907.
A. K. JOHNS & W. LANSING.
POULTRY FOUNTAIN.
APPLICATION FILED DEC. 21, 1906.

Witnesses.
Ed M Butterfield
W. A. Hubbard

Inventors
Albert K. Johns
William Lansing
By J. M. St. John
Atty.

THE NORRIS PETERS CO., WASHINGTON, D. C.

UNITED STATES PATENT OFFICE.

ALBERT K. JOHNS AND WILLIAM LANSING, OF CEDAR RAPIDS, IOWA.

POULTRY-FOUNTAIN.

No. 854,647.  Specification of Letters Patent.  Patented May 21, 1907.

Application filed December 21, 1906. Serial No. 349,000.

*To all whom it may concern:*

Be it known that we, ALBERT K. JOHNS and WILLIAM LANSING, citizens of the United States, residing at Cedar Rapids, in the county of Linn and State of Iowa, have invented certain new and useful Improvements in Poultry-Fountains, of which the following is a specification.

The object of this invention is to produce a poultry fountain adapted for individual use, but by a large number of fowls at the same time, and designed to furnish them pure, clean water, which in cold weather may be warmed, and to prevent the fouling of drinking water as is common where an open tank or trough is used.

The nature of the invention will clearly appear from the description and claims following, reference being had to the accompanying drawings, in which—

Figure 1:
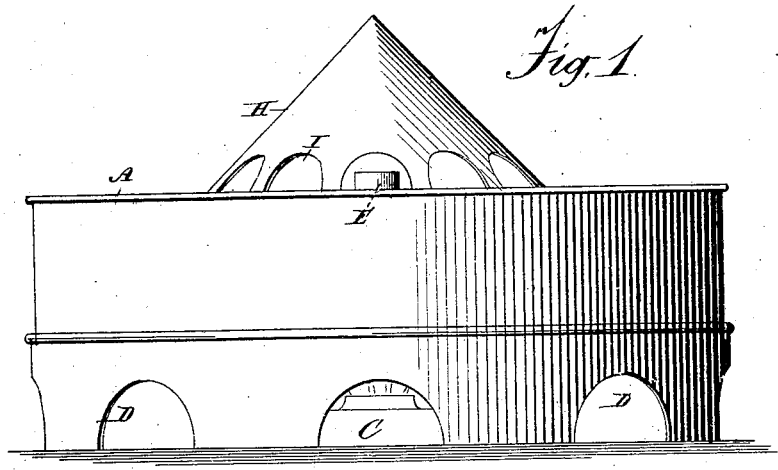
Figure 2:
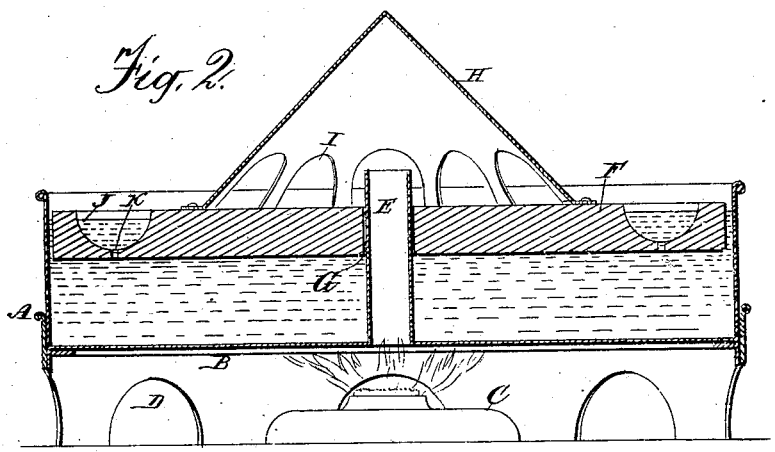
Figure 3:
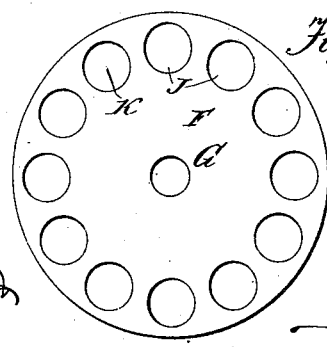

Figure 1 is a side elevation of a fountain embodying our invention. Fig. 2 is a central transverse section of the same. Fig. 3 is a top view of the float.

In the drawing, A designates a tank or pan of suitable material, such as galvanized iron, having a bottom B somewhat elevated from the ground, so as to make space below it for a small alcohol lamp C, or the like. Air-holes D admit air to support the combustion of the lamp. The tank is shown circular, but the particular shape, superficially, is not important. In the center of the tank is a flue E extending above the water line. In the case of an absolutely smokeless lamp this might be dispensed with, though in any case it forms a simple and efficient guide for the float F, which is provided with a corresponding central hole G. Over this flue the float is provided with a hood H, which in practice is made conical so as to prevent fowls from roosting on it and fouling the fountain. The hood also shelters the lamp from rain. It is provided with suitable air-holes I.

Near the rim of the float, on top, is a ring of cavities J, with small holes K at the bottom, passing through the float, so as to admit water from below. In practice the float is simply a block of light wood.

The operation of the fountain is obvious. The tank is supplied with water. The float is then placed in position, and sinks in the water sufficiently to bring the water level in the individual cups about as indicated in the drawing. This level remains uniform as to the float, regardless of the depth of water in the tank. Each fowl may now drink from a single cup, undisturbed by others, and of water that is clean and sanitary.

The fountain is so constructed as to be easily accessible in renewing the water, and for cleaning, it not being pretended that the fountain is dirt-proof, though it is practically proof against fouling by the poultry themselves.

Having thus described our invention, what we claim as new, and desire to secure by Letters Patent, is:

1. In a poultry fountain, the combination of a water tank and a float provided with cups or cavities in the top thereof, said cups being provided with an opening leading to the water below.

2. In a poultry fountain, the combination of a water-tank, a float provided with cups communicating with the water in the tank, and an inclined superstructure attached to the float to prevent the fowls from roosting on the float.

3. In a poultry fountain, the combination of a water-tank having a raised bottom, a ventilated space below it adapted to receive a lamp, and a float having individual drinking cups communicating with the water in the tank.

4. In a poultry fountain, the combination of water-tank having a raised bottom, ventilated sides below said bottom, and an air-shaft or flue extending from said bottom above the upper water line, a float adapted to rise and fall in said tank, and having individual cups communicating at the bottom with the water in the tank, and a ventilated hood attached to the float over said flue.

In testimony whereof I affix my signature in presence of two witnesses.

ALBERT K. JOHNS.
WILLIAM LANSING.

Witnesses:
J. M. ST. JOHN,
J. R. BROOKS.